(12) United States Patent
Schmale et al.

(10) Patent No.: US 8,122,710 B2
(45) Date of Patent: Feb. 28, 2012

(54) THERMAL MANAGEMENT OF UREA DOSING COMPONENTS IN AN ENGINE EXHAUST AFTER-TREATMENT SYSTEM

(75) Inventors: Mark Schmale, Blue Bell, PA (US); Gregory A. Griffin, Glendale Heights, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 611 days.

(21) Appl. No.: 12/325,854

(22) Filed: Dec. 1, 2008

(65) Prior Publication Data
US 2010/0132338 A1 Jun. 3, 2010

(51) Int. Cl.
*F01N 3/00* (2006.01)
*F01N 5/02* (2006.01)
(52) U.S. Cl. ................ 60/286; 60/287; 60/320
(58) Field of Classification Search ........... 60/286
See application file for complete search history.

(56) References Cited

U.S. PATENT DOCUMENTS

| | | | | |
|---|---|---|---|---|
| 3,685,310 | A | * 8/1972 | Fischer | 62/114 |
| 6,063,350 | A | * 5/2000 | Tarabulski et al. | 423/239.1 |
| 2007/0079599 | A1 | * 4/2007 | Osaku et al. | 60/283 |
| 2007/0180816 | A1 | * 8/2007 | Masuda et al. | 60/274 |

* cited by examiner

*Primary Examiner* — Thomas Denion
*Assistant Examiner* — Jason Shanske
(74) *Attorney, Agent, or Firm* — Jack D. Nimz; Mark C. Bach

(57) ABSTRACT

Dosing components (22, 24, 32) in an engine exhaust after-treatment system (18) that includes an SCR catalyst (20) are thermally managed by flowing engine coolant through a coolant passage in a urea injector (22) that injects aqueous urea into the after-treatment system, controlling a three-way valve (60) to selectively direct coolant flow leaving the urea injector to a first branch that is in heat exchange relationship with a tank (24) that holds a supply of aqueous urea and a supply pump module (32) that pumps aqueous urea from the tank to the urea injector, and a second branch that is not in heat exchange relationship with either the tank or the supply pump, and returning coolant from the branches to the engine cooling system.

15 Claims, 1 Drawing Sheet

THERMAL MANAGEMENT OF UREA DOSING COMPONENTS IN AN ENGINE EXHAUST AFTER-TREATMENT SYSTEM

FIELD OF THE INVENTION

This invention relates to internal combustion engines, especially motor vehicle engines that utilize dosing, such as urea dosing, for after-treatment of engine exhaust.

BACKGROUND OF THE INVENTION

The performance of a diesel engine after-treatment system in converting $NO_x$ to other products by selective catalytic reduction (SCR) relies on the presence of ammonia in the exhaust stream. Dosing engine exhaust by injection of aqueous urea, an ammonia-based reductant, into the exhaust stream at a location upstream of an SCR catalyst is one way to introduce ammonia into the exhaust system.

It is important for injected urea solution to completely evaporate because incomplete evaporation can lead to undesired consequences such as the formation of solid deposits in the exhaust system that can adversely affect the life and performance of the after-treatment system.

A known design practice places a urea injector at a location in the engine exhaust system where it can spray urea solution into the exhaust stream ahead of the SCR catalyst with the expectation that the injected liquid will completely evaporate by the time it reaches the catalyst. Because the urea injector is placed at the exhaust system, it absorbs heat from the passing exhaust gases. If the injector is downstream of a diesel particulate filter (DPF), it is at times (e.g., during active regeneration of the DPF, either controlled or uncontrolled) exposed to significantly elevated exhaust gas temperatures. In order to limit injector temperature rise, liquid coolant from the engine cooling system is constantly flowed through internal coolant passages in the injector.

A urea injection system also typically comprises a tank for holding a supply of aqueous urea and a supply pump for pumping solution from the tank to the injector. In addition to thermal management of the urea injector, thermal management of the pump and the tank is important because in a motor vehicle such as a truck the latter two components are typically mounted on the motor vehicle chassis where the urea solution is exposed to ambient temperature. In cold ambient temperatures near and below about 12° F., the liquid in the tank, pump, and associated conduits can freeze while in hot ambient temperatures, the solution can become unstable, significantly reducing its effectiveness when injected into the after-treatment system.

SUMMARY OF THE INVENTION

The present invention relates to improvement of thermal management of dosing components i.e. keeping each component within operable temperature limits, in an engine exhaust after-treatment system.

While the invention accomplishes thermal management of tank, pump, and injector in a way that provides the needed temperature regulation of dosing solution, it can also simplify the dosing system by reducing overall lengths of associated fluid conduits and complexity of connection hardware. Because the flow of engine coolant through the injector, in accordance with certain principles of the invention, can return to the engine cooling system only after having passed through either the tank, the pump or both, the invention is effective to pass heat that has been transferred from exhaust gases to the injector along to the tank, the pump, or both. In cold ambient temperatures, this can accelerate the thawing of frozen solution in the tank, pump, and/or associated conduits, aiding in achieving compliance with some specified time limit within which the reductant must become effective on the exhaust gas via SCR catalytic action.

For control of coolant flow to the pump and tank, the disclosed preferred embodiment of the invention utilizes a three-way valve. The valve is itself controlled by an electronic controller operating in a switching mode to cause engine coolant that has passed through the injector to flow either entirely through a first branch or entirely through a second branch. The first branch is arranged in heat transfer relation to the tank or the pump or both. The second branch is not, deliberately by-passing both tank and pump so that none of the coolant that has passed through the injector passes through either the tank or the pump.

When the controller is operating in the switching mode, it performs the switch function by sensing the temperature of solution inside the tank and sending a signal to open one of two valve outlet ports that leads to one of the two branches while closing the other outlet port that leads to the other of the two branches.

A first of the branches comprises a conduit from the valve to a coolant inlet port of the tank, a conduit from a coolant outlet port of the tank to a coolant inlet port of the supply pump module, and a return conduit from a coolant outlet port of the supply pump module to the engine cooling system. A second of the branches tees directly into the return conduit to the engine cooling system. As a consequence, the valve allows coolant to continuously flow through the injector regardless of which one of the two outlet ports is open.

The controller may also be configured to operate the valve in an apportioning mode. That mode can still allow either valve outlet port to be closed while the other remains open, but it also allows some flow through each valve outlet port. In any specific configuration, the relative amount of apportioning between the two branches is dependent on the specific valve and controller design.

Accordingly, a generic aspect of the invention relates to an internal combustion engine comprising combustion chambers within which fuel is combusted to operate the engine, a cooling system, including a coolant pump, for circulating liquid coolant through the engine, and an exhaust system through which products of combustion that include $NO_x$ are conveyed from the combustion chambers to atmosphere, including an SCR catalyst for chemically converting $NO_x$ to other products in the presence of urea introduced into the exhaust system.

A tank holds a supply of aqueous urea. A supply pump pumps aqueous urea from the tank into the exhaust system through a urea injector.

A heat exchange circuit comprises an inlet and an outlet in communication with the cooling system to provide for the coolant pump to flow liquid coolant through the heat exchange circuit.

A segment of the heat exchange circuit is disposed in heat exchange relationship with the urea injector, and downstream of that segment there is a controller for controlling the flow of coolant that has exchanged heat with the urea injector to a first branch that is in heat exchange relationship with the tank and the supply pump and a second branch that is not in heat exchange relationship with either the tank or the supply pump.

Another generic aspect of the invention relates to a method of thermal management of dosing components in an engine exhaust after-treatment system that includes an SCR catalyst for chemically converting $NO_x$ in engine exhaust gas to other products in the presence of urea introduced into the aftertreatment system.

The method comprises flowing engine coolant from a liquid cooling system of the engine through a coolant passage in a urea injector that injects aqueous urea into the after-treatment system upstream of the SCR catalyst, then selectively directing coolant flow leaving the urea injector to a first branch that is in heat exchange relationship with at least one of a tank that holds a supply of aqueous urea and a supply pump that pumps aqueous urea from the tank to the urea injector, and a second branch that is not in heat exchange relationship with either the tank or the supply pump, and then returning coolant from the branches to the engine cooling system.

Still another generic aspect of the invention relates to an internal combustion engine comprising combustion chambers within which fuel is combusted to operate the engine, a cooling system, including a coolant pump, for circulating liquid coolant through the engine, and an exhaust system through which products of combustion are conveyed from the combustion chambers to atmosphere, including an exhaust after-treatment device for chemically converting a product of combustion to a different product in the presence of a dosing agent that is introduced into the exhaust system.

A tank holds a supply of dosing agent. A supply pump module pumps dosing agent from the tank into the exhaust system. A heat exchange circuit comprises an inlet and an outlet in communication with the cooling system to provide for the engine coolant pump to flow liquid coolant through the heat exchange circuit.

The heat exchange circuit comprises a first branch in heat exchange relationship with at least one of the tank and the supply pump module, a second branch not in heat exchange relationship with either the tank or the supply pump module, and a controller for controlling coolant flow through the respective branches.

The foregoing, along with further features and advantages of the invention, will be seen in the following disclosure of a presently preferred embodiment of the invention depicting the best mode contemplated at this time for carrying out the invention. This specification includes a drawing, now briefly described as follows.

DESCRIPTION OF THE PREFERRED EMBODIMENT

Figure 1:
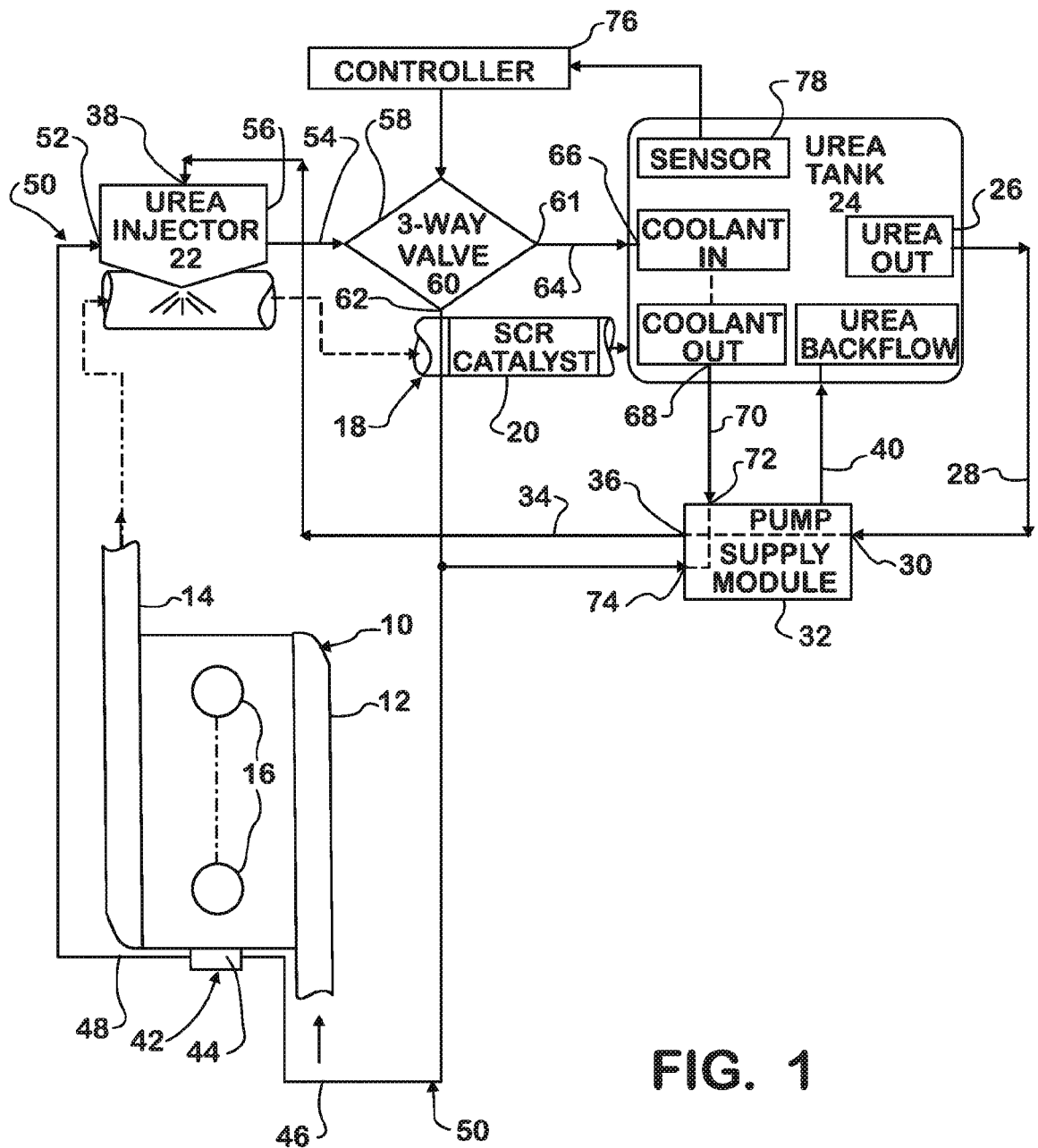
FIG. 1 is a general schematic diagram of a diesel engine including a cooling system portion, an exhaust after-treatment portion, and after-treatment dosing components, in accordance with principles of the present invention.

FIG. 1 shows a diesel engine 10 comprising an intake system 12 through which charge air enters and an exhaust system 14 through which exhaust gas resulting combustion exits, not all details of those two systems that are typically present being shown. Engine 10 comprises a number of cylinders 16 forming combustion chambers into which fuel is injected by fuel injectors to combust with the charge air that has entered through intake system 12. Energy released by combustion powers the engine via pistons connected to a crankshaft. When used to propel a motor vehicle, such as a truck, engine 10 is coupled through a drivetrain to driven wheels that propel the vehicle. Intake valves control the admission of charge air into cylinders 16, and exhaust valves control the outflow of exhaust gas through exhaust system 14 and ultimately to atmosphere. Before entering the atmosphere however, the exhaust gas is treated by one or more after-treatment devices in an after-treatment system 18.

One such after-treatment device is an SCR catalyst 20. A urea injector 22 is mounted on a portion of exhaust system 14 upstream of catalyst 20 with its outlet, or nozzle, arranged to spray aqueous urea into the exhaust system for entrainment with, and evaporatively mixing throughout, engine exhaust gas coming from cylinders 16. Catalyst 20 promotes a chemical reaction between the reductant and $NO_x$ in the exhaust gas that converts substantial amounts of $NO_x$ to other products before the exhaust gas passes into the atmosphere.

A tank 24 holds a supply of aqueous urea and is suitably vented to allow solution to be withdrawn at a port 26. A conduit 28 extends from port 26 to an inlet port 30 of a supply pump module 32. A conduit 34 extends from an outlet port 36 of supply pump module 32 to an inlet 38 of injector 22.

When supply pump module 32 operates, it draws solution from tank 24 through conduit 28, and pumps the solution through conduit 34 to injector 22, with a backflow conduit 40 returning excess solution to tank 24.

Engine 10 further comprises a liquid cooling system 42 through which engine coolant is circulated by a pump 44. Two conduits 46, 48 provide for a heat exchange circuit 50 for injector 22, tank 24, and supply pump module 32 to connect into cooling system 42. Conduit 48 is an inlet conduit for conveying coolant to a coolant inlet port 52 of injector 22. Heat exchange circuit 50 further comprises a conduit 54 connecting a coolant outlet port 56 of injector 22 to an inlet port 58 of a three-way valve 60 that also has two outlet ports 61, 62. A conduit 64 connects outlet port 61 to a coolant inlet port 66 of tank 24. A coolant outlet port 68 of tank 24 is connected through a conduit 70 to a coolant inlet port 72 of supply pump module 32. Conduit 50 is teed to a coolant outlet port 74 of supply pump module 32 and to outlet port 62 of valve 60.

The suction side of pump 44 acts through conduit 50 to apply suction to ports 62 and 74.

If valve 60 opens outlet port 61 to inlet port 58 while closing outlet port 62, the suction applied to outlet port 74 is effective to draw coolant through conduit 48, the coolant passage or passages in the body of injector 22, valve 60, tank 24, and supply pump module 32.

If valve 60 opens outlet port 62 to inlet port 58 while closing outlet port 61, the suction applied to outlet port 62 is effective to draw coolant through conduit 48, the coolant passage or passages in the body of injector 22, and valve 60, so that no coolant flows through tank 24 and supply pump module 32.

Consequently, the coolant entering inlet port 58 can, upon leaving valve 60, flow either through a branch that returns directly back to engine cooling system 42 or through a branch that contains the tank and supply pump module in succession before returning to the engine cooling system.

When the coolant flow is directly back to cooling system 42 without passing through the tank and supply pump module, heat transferred from injector 22 to the engine coolant flowing through it is returned for rejection via the engine cooling system.

When the coolant does not flow directly back to cooling system 42, but rather passes through the tank and supply pump module before doing so, heat transferred from injector 22 to the engine coolant can be transferred to the tank and the supply pump module, with residual heat being returned for rejection through cooling system 42.

Regardless of which branch the coolant is compelled to take upon leaving valve 60, coolant always flow through injector 22. The particular branch taken is determined by a controller 76 that functions to switch the flow from one branch to the other depending at least in part on the temperature of solution in tank 24 as measured by a temperature sensor 78. For example, whenever solution in tank 24 needs heating, controller 76 can operate valve 60 to cause coolant to flow through the tank and supply pump module, and whenever it doesn't, the controller can operate valve 60 to by-pass the tank and supply pump module. Any particular controller may use other inputs as appropriate.

A controller 76 may also function to apportion the flow between the two branches, as discussed earlier.

The various components mentioned mount on the truck chassis, such as on frame side rails and/or cross members, using conventional means of attachment, such as clips and stamped metal brackets.

While a presently preferred embodiment of the invention has been illustrated and described, it should be appreciated that principles of the invention apply to all embodiments falling within the scope of the following claims.

What is claimed is:

1. An internal combustion engine system comprising:
   combustion chambers within which fuel is combusted to operate the engine;
   a cooling system, including a coolant pump, for circulating liquid coolant through the engine;
   an exhaust system through which products of combustion that include $NO_x$ are conveyed from the combustion chambers to atmosphere, including an SCR catalyst for chemically converting $NO_x$ to other products in the presence of urea introduced into the exhaust system;
   a tank for holding a supply of aqueous urea;
   a supply pump for pumping aqueous urea from the tank into the exhaust system through a urea injector; and
   a heat exchange circuit comprising an inlet and an outlet in communication with the cooling system to provide for the coolant pump to flow liquid coolant through the heat exchange circuit;
   wherein a segment of the heat exchange circuit is disposed in heat exchange relationship with the urea injector, and downstream of that segment there is a controller for controlling the flow of coolant that has exchanged heat with the urea injector to a first branch that is in heat exchange relationship with the tank and the supply pump and a second branch that is not in heat exchange relationship with either the tank or the supply pump.

2. The engine system as set forth in claim 1 wherein the controller is configured to operate a controlled device having an inlet through which coolant that has passed through the urea injector enters the controlled device, a first outlet through which coolant that has entered the controlled device is delivered to the first branch, and a second outlet through which coolant that has entered the controlled device is delivered to the second branch.

3. The engine system as set forth in claim 2 wherein the controlled device comprises a valve and the controller further comprises an electric operator that operates in a switching mode to cause the valve to convey all of the entering flow to a selected one of the two branches to the exclusion of the other branch.

4. The engine system as set forth in claim 3 wherein the electric operator uses an electric signal based on a measurement of temperature in the tank to select one branch to the exclusion of the other.

5. A method of thermal management of dosing components in an engine exhaust after-treatment system that includes an SCR catalyst for chemically converting $NO_x$ in engine exhaust gas to other products in the presence of urea introduced into the after-treatment system, the method comprising:
   flowing engine coolant from a liquid cooling system of the engine through a coolant passage in a urea injector that injects aqueous urea into the after-treatment system upstream of the SCR catalyst;
   selectively directing coolant flow leaving the urea injector to a first branch that is in heat exchange relationship with at least one of a tank that holds a supply of aqueous urea and a supply pump that pumps aqueous urea from the tank to the urea injector, and a second branch that is not in heat exchange relationship with either the tank or the supply pump;
   and returning coolant from the branches to the engine cooling system.

6. The method as set forth in claim 5 in which coolant flowing through the first branch flows through both the tank and the supply pump.

7. The method as set forth in claim 6 in which coolant flowing through the first branch flows serially first through the tank and then through the supply pump.

8. The method as set forth in claim 5 wherein the step of selectively directing coolant flow leaving the urea injector to the first branch and the second branch comprises selectively operating a three-way valve.

9. An internal combustion engine system comprising:
   combustion chambers within which fuel is combusted to operate the engine;
   a cooling system, including a coolant pump, for circulating liquid coolant through the engine;
   an exhaust system through which products of combustion are conveyed from the combustion chambers to atmosphere, including an exhaust after-treatment device within which a product of combustion is chemically converted to a different product in the presence of a dosing agent that is introduced into the exhaust system;
   a tank for holding a supply of dosing agent;
   a supply pump for pumping dosing agent from the tank into the exhaust system; and
   a heat exchange circuit comprising an inlet and an outlet in communication with the cooling system to provide for the coolant pump to flow liquid coolant through the heat exchange circuit;
   wherein a segment of the heat exchange circuit is upstream of a first branch in heat exchange relationship with at least one of the tank and the supply pump, a second branch not in heat exchange relationship with either the tank or the supply pump, and a controller for controlling coolant flow through the respective branches.

10. The engine system as set forth in claim 9 wherein the segment of the heat exchange circuit that is upstream of the first and second branches is in heat exchange relationship with an injecting device at the exhaust system through which the supply pump forces dosing agent into the exhaust system.

11. The engine system as set forth in claim 9 wherein the controller is configured to operate a controlled device having an inlet through which coolant that has passed through the injecting device enters the controlled device, a first outlet through which coolant that has entered the controlled device is delivered to the first branch, and a second outlet through which coolant that has entered the controlled device is delivered to the second branch.

12. The engine system as set forth in claim 11 wherein the controlled device comprises a valve and the controller further comprises an electric operator that operates in a switching mode to cause the valve to convey all of the entering flow to a selected one of the two branches to the exclusion of the other branch.

13. The engine system as set forth in claim 12 wherein the controller delivers an electric input to the electric operator to select one of the two branches to the exclusion of the other branch for conveyance of coolant flow.

14. The engine system as set forth in claim 13 wherein the electric input to the electric operator is based on a measurement of temperature in the first branch by a temperature sensor.

15. The engine system as set forth in claim 14 wherein the first branch has heat exchange relationship initially with the tank and subsequently with the supply pump, and the temperature sensor is disposed to measure the temperature of the dosing agent in the tank.

\* \* \* \* \*